(12) United States Patent
Li

(10) Patent No.: US 9,438,407 B2
(45) Date of Patent: Sep. 6, 2016

(54) METHOD AND APPARATUS TO HANDLE UPLINK (UL) INFORMATION IN A WIRELESS COMMUNICATION SYSTEM

(71) Applicant: INNOVATIVE SONIC CORPORATION, Taipei (TW)

(72) Inventor: Ming-Che Li, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 169 days.

(21) Appl. No.: 14/068,330

(22) Filed: Oct. 31, 2013

(65) Prior Publication Data

US 2014/0119304 A1    May 1, 2014

Related U.S. Application Data

(60) Provisional application No. 61/721,243, filed on Nov. 1, 2012.

(51) Int. Cl.
*H04J 3/08* (2006.01)
*H04L 5/00* (2006.01)
*H04W 52/14* (2009.01)
(Continued)

(52) U.S. Cl.
CPC .......... *H04L 5/0082* (2013.01); *H04W 52/146* (2013.01); *H04W 52/281* (2013.01); *H04W 52/325* (2013.01); *H04W 52/367* (2013.01); *H04W 52/40* (2013.01); *H04W 72/005* (2013.01); *H04L 5/001* (2013.01); *H04L 5/0023* (2013.01); *H04L 5/0035* (2013.01); *H04L 5/0053* (2013.01); *Y02B 60/50* (2013.01)

(58) Field of Classification Search
CPC ...................................................... H04W 28/04
USPC .......................................................... 370/329
See application file for complete search history.

(56) References Cited

U.S. PATENT DOCUMENTS

2009/0259911 A1    10/2009  Tseng
2011/0141928 A1*    6/2011  Shin et al. .................... 370/252
(Continued)

FOREIGN PATENT DOCUMENTS

TW          I320648       2/2010
TW       201010328 A1    3/2010
(Continued)

OTHER PUBLICATIONS

Office Action on corresponding TW Patent Application No. 102139259 dated Jul. 2, 2015.

*Primary Examiner* — Samina Choudhry
(74) *Attorney, Agent, or Firm* — Blue Capital Law Firm, P.C.

(57) ABSTRACT

A method and apparatus are disclosed to handle UL information. The method includes configuring a UE (User Equipment) with multiple serving cells. The method further includes transmitting, from the UE, in a subframe i a first UL control information on a physical channel of a first UL serving cell. The method also includes transmitting, from the UE, in the subframe i a second UL control information on a physical channel of a second UL serving cell, wherein if the total transmit power of the UE exceeds $\hat{P}_{CMAX}(i)$, the UE would scale down the transmit power of the physical channel with lower power priority based on types of the first UL control information and the second UL control information.

38 Claims, 6 Drawing Sheets

(51) Int. Cl.
  *H04W 52/28* (2009.01)
  *H04W 52/32* (2009.01)
  *H04W 52/36* (2009.01)
  *H04W 52/40* (2009.01)
  *H04W 72/00* (2009.01)

(56) References Cited

U.S. PATENT DOCUMENTS

2011/0243066 A1* 10/2011 Nayeb Nazar et al. ...... 370/328
2012/0113831 A1* 5/2012 Pelletier et al. ............... 370/252
2013/0230004 A1* 9/2013 Nam et al. .................... 370/329
2013/0260735 A1* 10/2013 Dinan ........................... 455/418

FOREIGN PATENT DOCUMENTS

TW 201032522 A1 9/2010
TW M390617 10/2010

* cited by examiner

METHOD AND APPARATUS TO HANDLE UPLINK (UL) INFORMATION IN A WIRELESS COMMUNICATION SYSTEM

CROSS-REFERENCE TO RELATED APPLICATIONS

The present Application claims the benefit of U.S. Provisional Patent Application Ser. No. 61/721,243 filed on Nov. 1, 2012, the entire disclosure of which is incorporated herein by reference.

FIELD

This disclosure generally relates to wireless communication networks, and more particularly, to a method and apparatus to handle Uplink (UL) information in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed to handle UL information. The method includes configuring a UE (User Equipment) with multiple serving cells. The method further includes transmitting, from the UE, in a subframe i a first UL control information on a physical channel of a first UL serving cell. The method also includes transmitting, from the UE, in the subframe i a second UL control information on a physical channel of a second UL serving cell, wherein if the total transmit power of the UE exceeds $\hat{P}_{CMAX}(i)$, the UE would scale down the transmit power of the physical channel with lower power priority based on types of the first UL control information and the second UL control information.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. RP-120838, "Summary of 3GPP TSG-RAN Workshop on Release 12 and Onward", TSG-RAN Chairman; RWS-120046, "Technologies for Rel-12 and Onwards", Samsung; RWS-120003, "LTE Release 12 and Beyond", Ericsson, ST-Ericsson; TS 36.331 V11.1.0, "E-UTRA Radio Resource Control (RRC) (Release 11)"; and TS 36.213 V11.0.0, "E-UTRA Physical layer procedures (Release 11)". The standards and documents listed above are hereby expressly incorporated herein.

Figure 1:
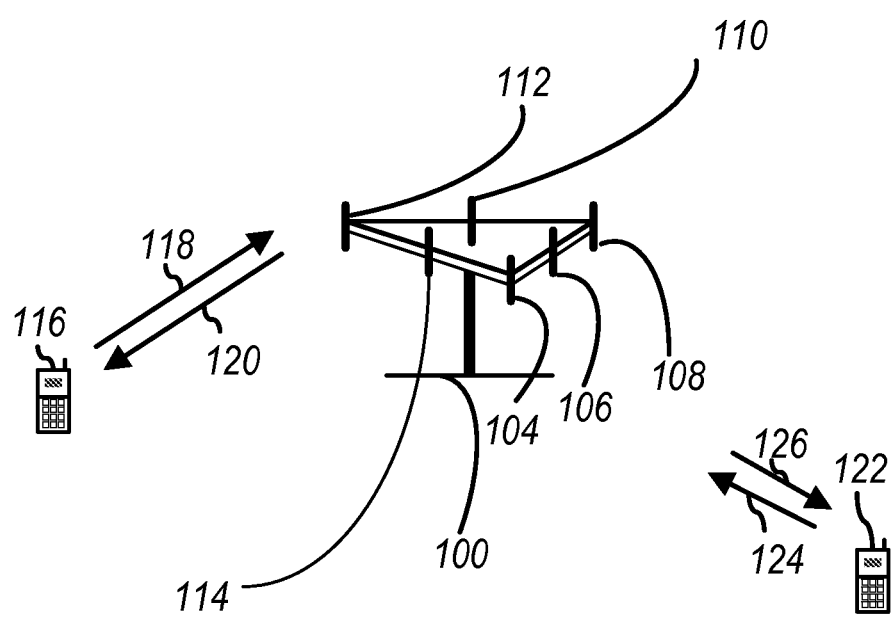
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
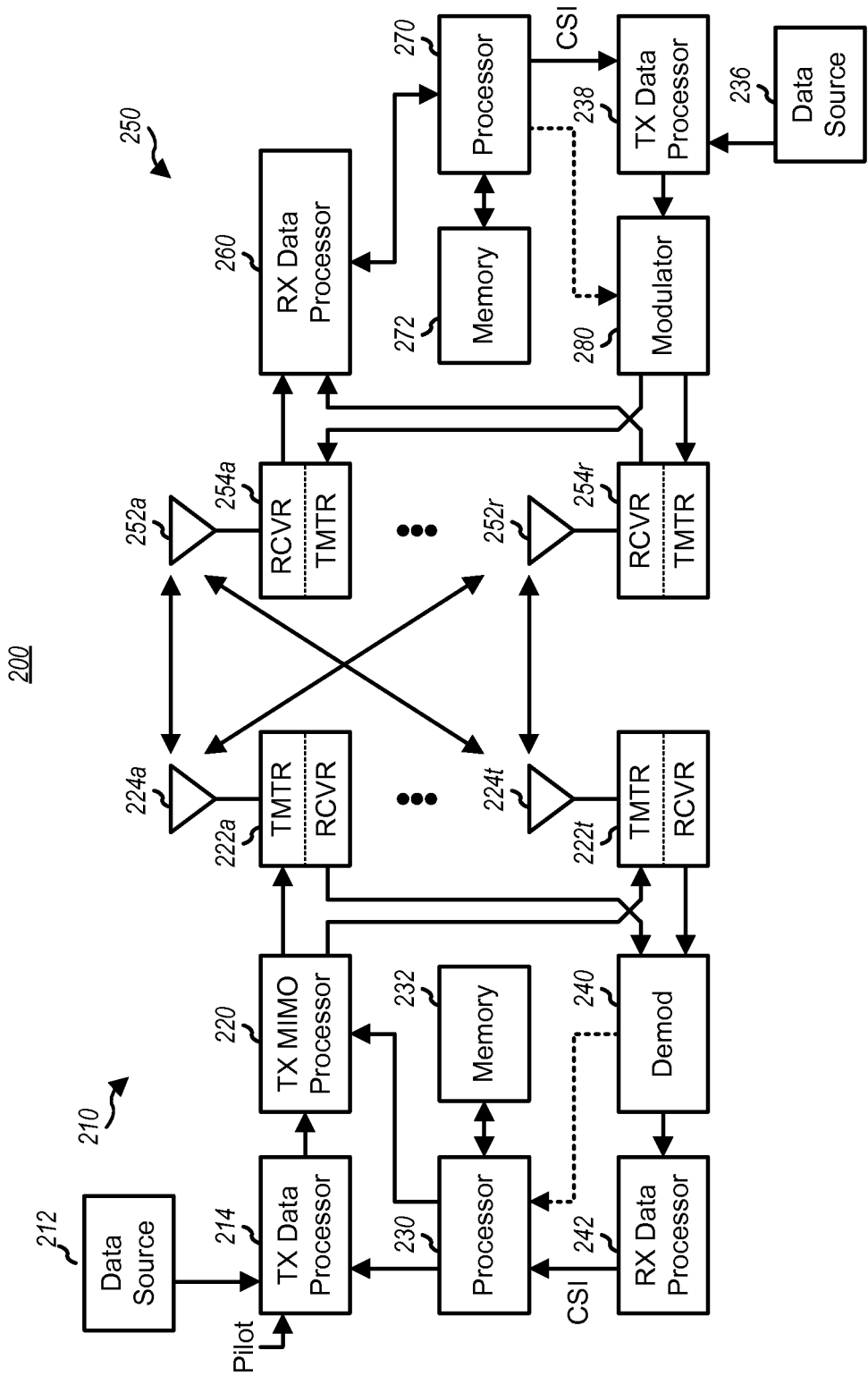
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
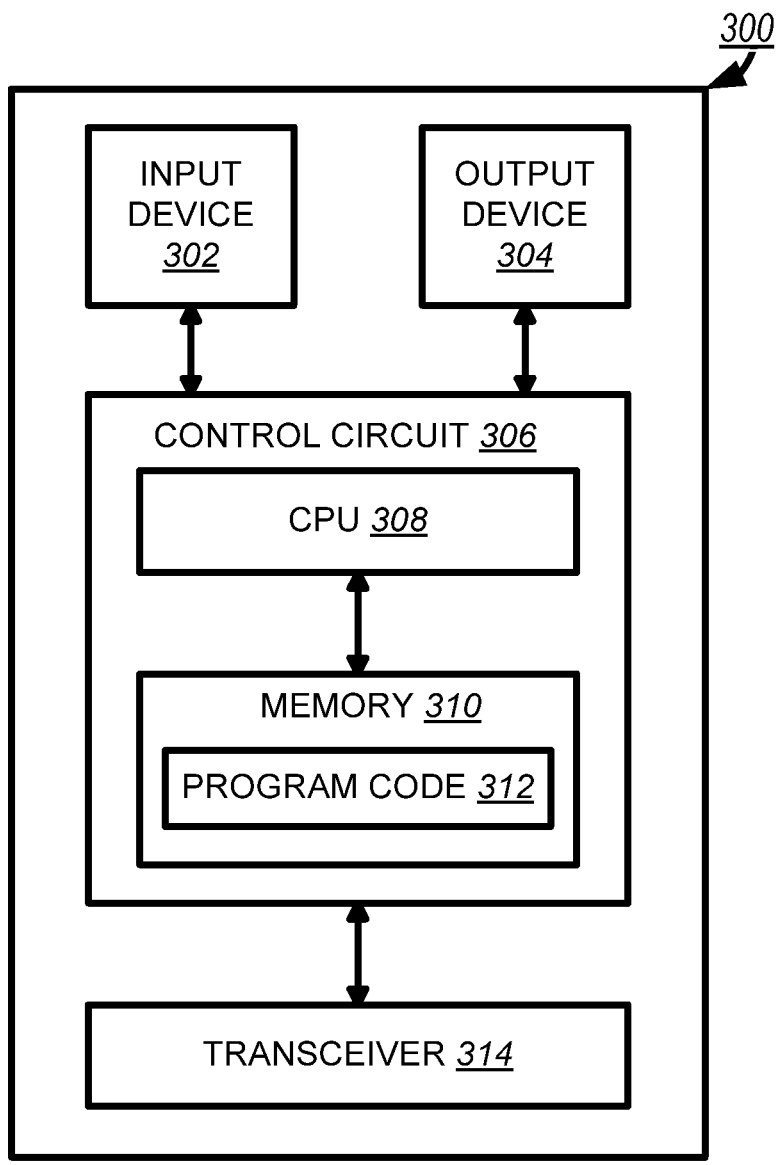
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
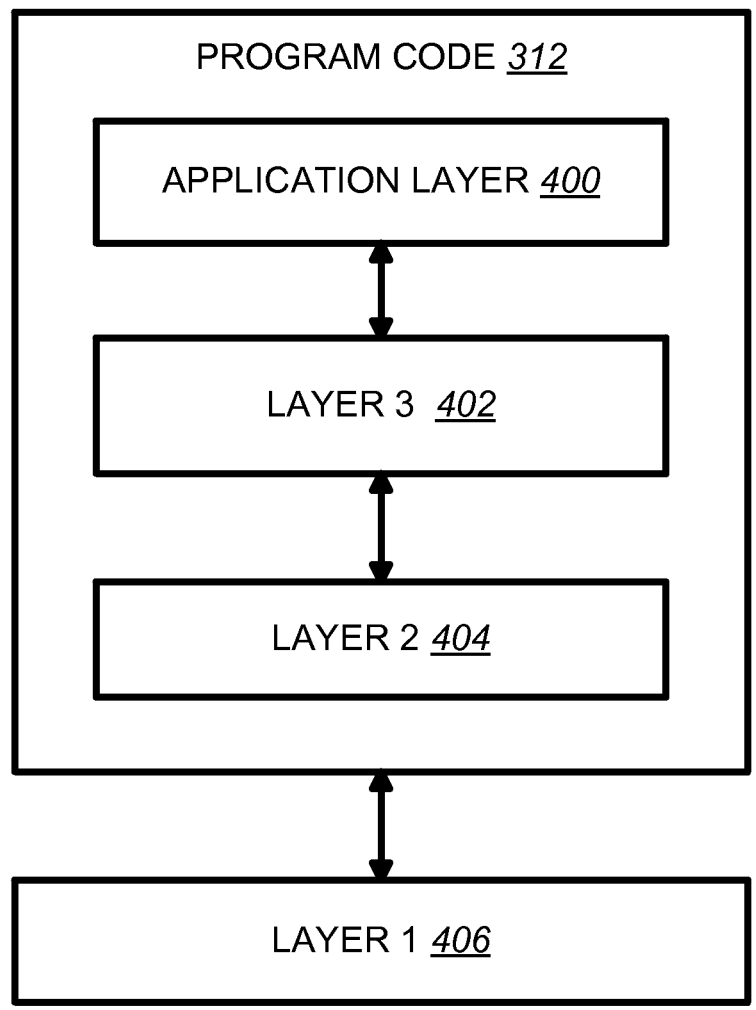
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

As shown in 3GPP RP-120838, there was much interest in Enhanced Small Cell for LTE. Technologies proposed by many members include inter site Carrier Aggregation (CA) as discussed in 3GPP RWS-120046, and frequency separation between macro and small cells with higher frequency band (e.g., 3.5 GHz band) for the small cells as discussed in 3GPP RWS-120003.

In LTE Rel. 10/11, only intra-eNB CA is considered. For a Rel. 10/11 UE, subframe bundling operation (TTI bundling) is configured by parameter ttiBundling provided by higher layers. The subframe bundling operation is not simultaneously configured with UL CA according to the following description in 3GPP TS 36.213 V11.0.0:
ttiBundling
TRUE indicates that TTI bundling TS 36.321 [6] is enabled while FALSE indicates that TTI bundling is disabled. TTI bundling can be enabled for FDD and for TDD only for configurations 0, 1 and 6. For TDD, E-UTRAN does not simultaneously enable TTI bundling and semi-persistent scheduling in this release of specification. Furthermore, E-UTRAN does not simultaneously configure TTI bundling and SCells with configured uplink.

For a Rel.10/11 UE configured with carrier aggregation, the delivering behavior of uplink control information is specified in 3GPP TS 36.213 V11.0.0 as follows: If the UE is configured with more than one serving cell and is not configured for simultaneous PUSCH and PUCCH transmission, then in subframe n UCI shall be transmitted

- on PUCCH using format 1/1a/1b/3 or 2/2a/2b if the UE is not transmitting PUSCH
- on PUSCH of the serving cell given in section 7.2.1 if the UCI consists of aperiodic CSI or aperiodic CSI and HARQ-ACK
- on primary cell PUSCH if the UCI consists of periodic CSI and/or HARQ-ACK and if the UE is transmitting on the primary cell PUSCH in subframe n unless the primary cell PUSCH transmission corresponds to a Random Access Response Grant or a retransmission of the same transport block as part of the contention based random access procedure, in which case UCI is not transmitted
- on PUSCH of the secondary cell with smallest SCellIndex if the UCI consists of periodic CSI and/or HARQ-ACK and if the UE is not transmitting PUSCH on primary cell but is transmitting PUSCH on at least one secondary cell If the UE is configured with more than one serving cell and simultaneous PUSCH and PUCCH transmission, then in subframe n UCI shall be transmitted

- on PUCCH using format 1/1a/1b/3 if the UCI consists only of HARQ-ACK and/or SR
- on PUCCH using format 2 if the UCI consists only of periodic CSI
- as described in section 10.1.1, if the UCI consists of periodic CSI and HARQ-ACK and if the UE is not transmitting on PUSCH
- on PUCCH and primary cell PUSCH if the UCI consists of HARQ-ACK and periodic CSI and the UE is transmitting PUSCH on the primary cell, in which case the HARQ-ACK is transmitted on PUCCH using format 1a/1b/3 and the periodic CSI is transmitted on PUSCH unless the primary cell PUSCH transmission corresponds to a Random Access Response Grant or a retransmission of the same transport block as part of the contention based random access procedure, in which case periodic CSI is not transmitted
- on PUCCH and PUSCH of the secondary cell with the smallest SCellIndex if the UCI consists of HARQ-ACK and periodic CSI and if the UE is not transmitting PUSCH on primary cell but is transmitting PUSCH on at least one secondary cell, in which case, the HARQ-ACK is transmitted on PUCCH using format 1a/1b/3 and the periodic CSI is transmitted on PUSCH
- on PUCCH and PUSCH if the UCI consists of HARQ-ACK/HARQ-ACK+SR/positive SR and aperiodic CSI in which case the HARQ-ACK/HARQ-ACK+SR/positive SR is transmitted on PUCCH using format 1/1a/1b/3 and the aperiodic CSI is transmitted on PUSCH of the serving cell given in Section 7.2.1

If the UE is configured with more than one serving cell, then reporting prioritization and collision handling of periodic CSI reports of a certain PUCCH reporting type is given in Section 7.2.2.

A UE transmits PUCCH only on the primary cell.

Furthermore 3GPP RWS-120046 proposes inter-eNB CA and its corresponding architecture for LTE Rel.12. As discussed in 3GPP RWS-120046, the macro-cell layer f1 is controlled by serving eNB for mobility robustness, and the small cells in f2 is controlled by the drift eNB (D-eNB) for throughput boost. To reduce the interface loading between the serving eNB and the drift eNB, self-operating D-eNBs could be enabled with some RAN1/2 enhancements, such as D-eNB UL Control Info handling and RACH (Random Access Channel) Msg2 from the D-eNB.

In legacy releases, the uplink control information in a subframe is transmitted (i) on a PUCCH of primary cell, (ii) on a PUSCH transmission, or (iii) on a PUCCH (Physical Uplink Control Channel) and a PUSCH (Physical Uplink Shared Channel) if the UE is configured with simultaneous PUSCH and PUCCH transmissions and the uplink control information consists of HARQ-ACK (Hybrid Automatic Repeat Request Acknowledgement) and CSI (Channel State Information). In general, the PUCCH transmission would have higher power priority than the PUSCH transmission in situations where power is limited.

From the system level in the scenario of inter-eNB carrier aggregation, delivering UL control information only via macro cell would induce PUCCH capacity problems since multiple small cells could potentially be densely deployed within the coverage of the macro cell. Furthermore, considering that data transmissions on different aggregated cells are scheduled/controlled by different eNBs, limiting UL control information transmission on macro cell would also increase the loading of connection(s) between eNBs since the serving eNB requires the delivery of UL control information to drift eNBs for each time the serving eNB receives the UL control information of small cells from the served UEs. Under the circumstances, it would be a good direction to consider delivering UL control information on primary cell and secondary cell in a subframe for an UE configured with inter-eNB CA. Furthermore, if the UE has limited access to power, the UE would need to determine how to allocate UL transmit power for each transmission of UL control information.

In general, for an UE configured with inter-eNB carrier aggregation, one possible way to deliver uplink control information is to define multiple groups, such as PUCCH groups, for the UE so that configured serving cells controlled by the same eNB would be assigned in the same PUCCH group. Furthermore, the transmission on an UL serving cell could include the uplink control information of the serving cells belonging to the same PUCCH group. In addition, the uplink control information of the serving cells in a PUCCH group would not be transmitted on any serving cells belonging to different PUCCH group(s).

Based on the general concept, a UE configured with inter-eNB carrier aggregation could transmit the uplink control information on different UL serving cells for different PUCCH groups in a subframe. For example, in a subframe, the UE could transmit uplink control information on PUCCH or on PUSCH of an UL serving cell in first PUCCH group, and could also transmits uplink control information on PUCCH or on PUSCH of an UL serving cell in second PUCCH group. If the UE is uplink power limited, the method for power handling between PUCCH groups would depend on the type of delivered UL control information. In one embodiment, the transmission of a Scheduling Request would have higher priority than a HARQ-ACK transmission. Furthermore, the priority of transmission of a CSI report would be lower than the priority of a Scheduling Request transmission and a HARQ-ACK transmission. Moreover, the transmission of an aperiodic CSI report would have higher priority than the transmission of a periodic CSI report. Also, if the type of delivered uplink control information between PUCCH groups is the same, the transmission on PUCCH would have higher priority than the transmission on PUSCH.

Following the method described above, as example, if the UL control information transmitted on PUCCH in first PUCCH group is a CSI report, and the UL control information multiplexed on PUSCH in second PUCCH group is a HARQ-ACK, the HARQ-ACK multiplexed on PUSCH would have higher power priority. Thus, it is possible that the PUSCH transmission has higher power priority than the PUCCH transmission.

Figure 5:
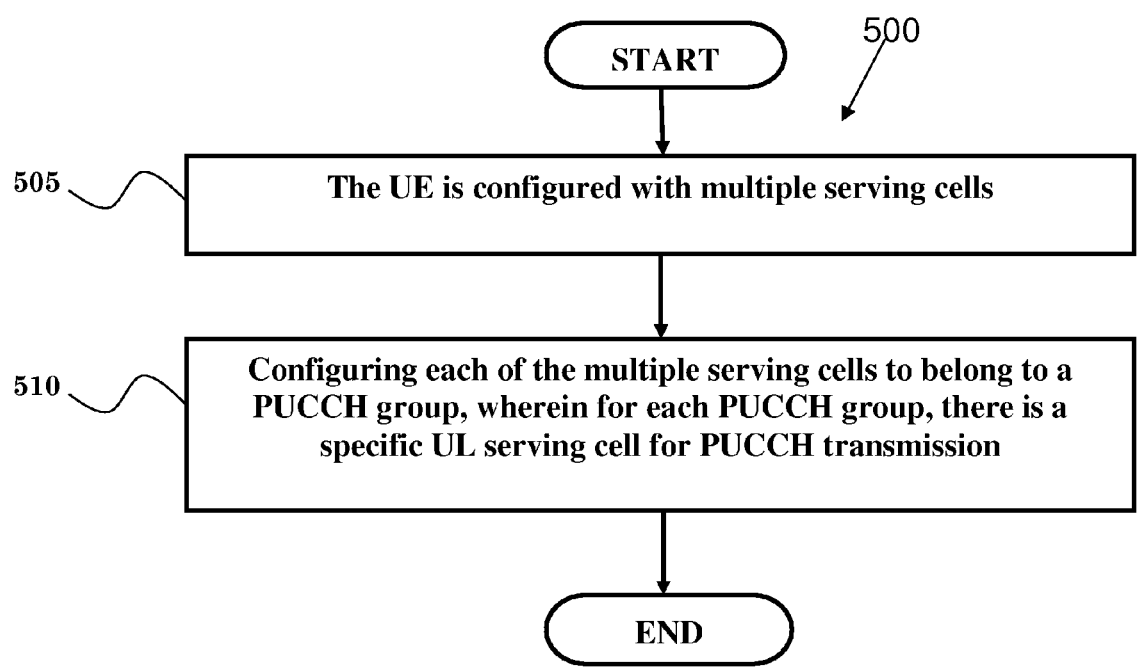
FIG. 5 is a flow chart according to one exemplary embodiment.

FIG. 5 is a flow chart 500 in accordance with one exemplary embodiment. In step 505, the UE (User Equipment) is configured with multiple serving cells. In one embodiment, the configured cells are controlled or scheduled by different eNBs (evolved Node B). In an alternative embodiment, the configured serving cells controlled by the same eNB are assigned in the same PUCCH group. In addition, the UL control information of the serving cells belonging to a same PUCCH group transmission is transmitted on the PUCCH of the specific UL cell, or is multiplexed and transmitted on the PUSCH of one UL serving cell. Furthermore, the UL control information of the serving cells belonging to a PUCCH group is not transmitted on any UL serving cells belonging to a different PUCCH group.

Returning to FIG. 5, in step 510, each of the configured serving cells is configured to belong to a PUCCH group, wherein for each PUCCH group, there is a specific UL cell for PUCCH transmission. In one embodiment, the specific UL serving cell is a primary cell if the PUCCH group includes the primary cell, or is the serving cell with the smallest SCellIndex within the PUCCH group. In addition, the UL control information of the serving cells belonging to the same PUCCH group transmission could be multiplexed and transmitted on a PUSCH (Physical Uplink Shared Channel) of the serving cell with the smallest SCellIndex in the PUCCH group. Furthermore, the specific UL serving cell could be configured by a higher layer.

Referring back to FIGS. 3 and 4, in one embodiment, the device 300 includes a program code 312 stored in memory 310. In one embodiment, the CPU 308 could execute the program code 312 (i) to configure the UE with multiple serving cells, and (ii) to configure each of the configured serving cells to belong to a PUCCH group, wherein for each PUCCH group, there is a specific UL cell for PUCCH transmission. In addition, the CPU 308 could execute the program code 312 to perform all of the above-described actions and steps or others described herein.

Figure 6:
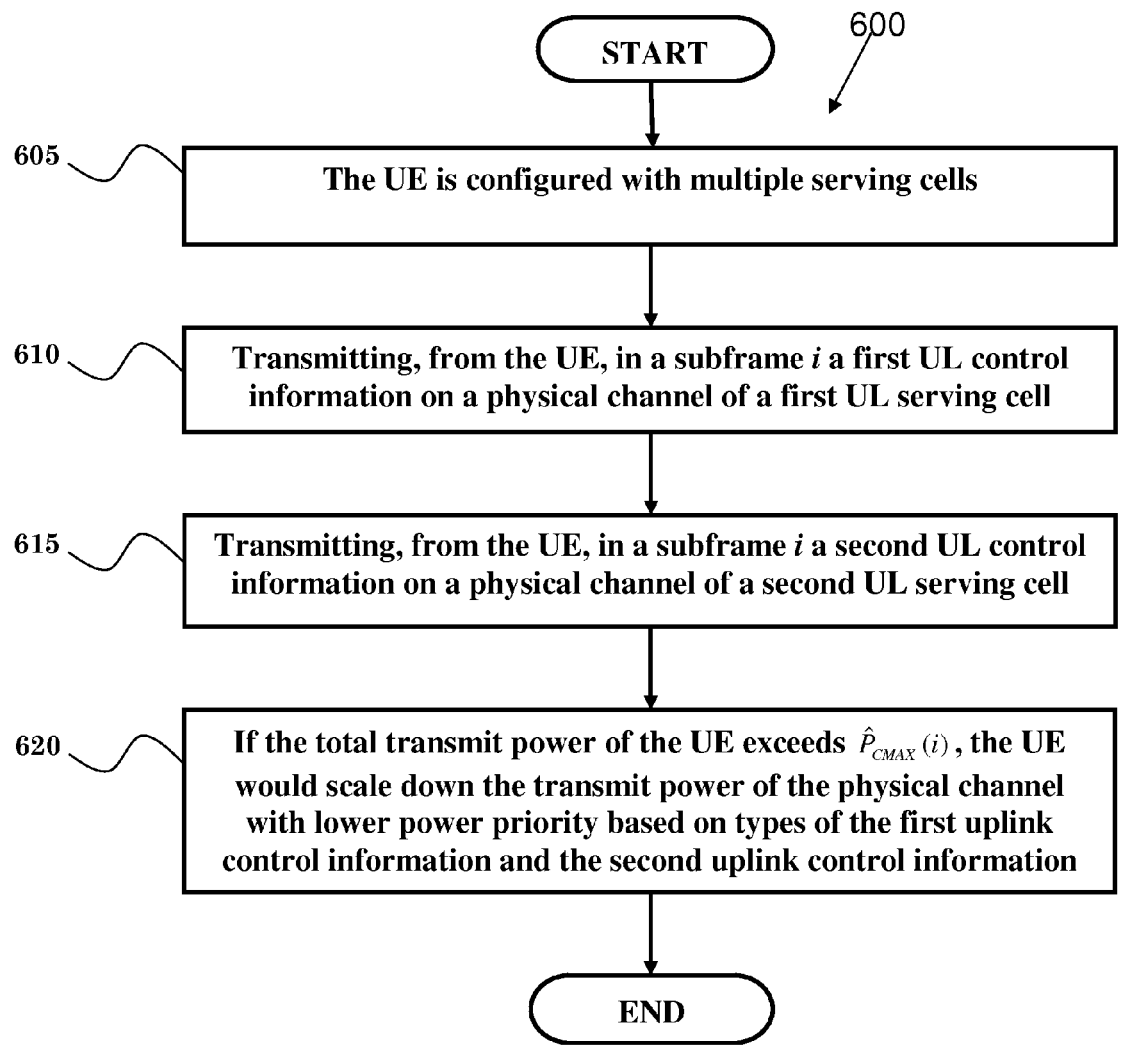
FIG. 6 is a flow chart according to one exemplary embodiment.

FIG. 6 is a flow chart 600 in accordance with one exemplary embodiment. In step 605, the UE is configured with multiple serving cells. In one embodiment, the configured serving cells are controlled or scheduled by different eNBs (evolved Node B).

In step 610 of FIG. 6, the UE transmits in a subframe i a first UL control information on a physical channel of a first UL serving cell. In step 615, the UE transmits in the subframe i a second UL control information on a physical channel of a second UL serving cell. In one embodiment, the physical channels of the first UL serving cell and the second UL serving cell could be PUCCHs or PUSCHs. Alternatively, the physical channel of the first UL serving cell could be a PUCCH, while the physical channel of the second UL serving cell could be a PUSCH.

In one embodiment, the UL control information could include a Scheduling Request, a HARQ-ACK (Hybrid Automatic Repeat Request Acknowledgement), or a CSI (Channel State Information) report. Furthermore, the Scheduling Request would have higher power priority than HARQ-ACK; the HARQ-ACK would have higher power priority than the CSI report; and an aperiodic CSI report would have higher power priority than a periodic CSI report. In addition, if the first UL control information type is the same as the second UL control information type, a PUCCH (Physical Uplink Control Channel) transmission would have higher priority than a PUSCH (Physical Uplink Shared Channel) transmission. Also, if the first UL control information on PUCCH is a CSI report and the second UL control information on PUSCH is a HARQ-ACK (Hybrid Automatic Repeat Request Acknowledgement), a PUSCH (Physical Uplink Shared Channel) transmission would have higher power priority than a PUCCH (Physical Uplink Control Channel) transmission.

In one embodiment, the first uplink serving cell and the second uplink serving cell belong to different PUCCH (Physical Uplink Control Channel) groups. In addition, the first UL control information includes the UL control information of the serving cells (including the first UL serving cell) belonging to a PUCCH group. Furthermore, the second UL control information includes the UL control information of the serving cells (including the second UL serving cell) belonging to the PUCCH group.

Returning to FIG. 6, in step 615, if the total transmit power of the UE exceeds $\hat{P}_{CMAX}(i)$, the UE would scale down the transmit power of the physical channel with lower power priority based on types of the first UL control information and the second UL control information. In one embodiment, if the first UL control information type is the same as the second UL control information type, transmit power of both physical channels would be scaled down by a same proportion.

Referring back to FIGS. 3 and 4, in one embodiment, the device 300 includes a program code 312 stored in memory 310. In one embodiment, the CPU 308 could execute the program code 312 (i) to configure a UE with multiple serving cells, (ii) to transmit, from the UE, in a subframe i a first UL control information on a physical channel of a first UL serving cell, and (iii) to transmit, from the UE, in the subframe i a second UL control information on a physical channel of a second UL serving cell, wherein if the total transmit power of the UE exceeds $\hat{P}_{CMAX}(i)$, the UE would scale down the transmit power of the physical channel with lower power priority based on types of the first UL control information and the second UL control information. In addition, the CPU 308 could execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method to handle UL (Uplink) control information, comprising:
   configuring a UE (User Equipment) with multiple serving cells;
   transmitting, from the UE, in a subframe i a first UL control information on a physical channel of a first UL serving cell; and
   transmitting, from the UE, in the subframe i a second UL control information on a physical channel of a second UL serving cell;
   wherein if the total transmit power of the UE exceeds $\hat{P}_{CMAX}(i)$, which is a linear value of UE total configured maximum output power in subframe i, the UE would scale down the transmit power of the physical channel with lower power priority based on types of the first UL control information and the second UL control information, and
   wherein if the first UL control information type is the same as the second UL control information type, a PUCCH (Physical Uplink Control Channel) transmission would have higher priority than a PUSCH (Physical Uplink Shared Channel) transmission.

2. The method of claim 1, wherein the physical channel of the first UL serving cell is a PUCCH, and the physical channel of the second UL serving cell is a PUSCH.

3. The method of claim 1, wherein the UL control information includes a Scheduling Request, a HARQ-ACK (Hybrid Automatic Repeat Request Acknowledgement), or a CSI (Channel State Information) report.

4. The method of claim 3, wherein the Scheduling Request has higher power priority than HARQ-ACK, the HARQ-ACK has higher power priority than the CSI report, and an aperiodic CSI report has higher power priority than a periodic CSI report.

5. The method of claim 1, wherein if the first uplink control information on PUCCH is a CSI report and the second uplink control information on PUSCH is a HARQ- ACK (Hybrid Automatic Repeat Request Acknowledgement), a PUSCH transmission would have higher power priority than a PUCCH transmission.

6. The method of claim 1, wherein the configured serving cells are controlled or scheduled by different eNBs (evolved Node B).

7. The method of claim 1, wherein the first UL serving cell and the second UL serving cell belong to different PUCCH groups.

8. The method of claim 1, wherein the first UL control information includes the UL control information of the serving cells (including the first UL serving cell) belonging to a PUCCH group.

9. The method of claim 1, wherein the second UL control information includes the UL control information of the serving cells (including the second UL serving cell) belonging to a PUCCH group.

10. A communication device to handle UL (Uplink) control information, the communication device comprising:
a control circuit;
a processor installed in the control circuit;
a memory installed in the control circuit and operatively coupled to the processor;
wherein the processor is configured to execute a program code stored in the memory to handle UL control information by:
configuring a UE (User Equipment) with multiple serving cells;
transmitting, from the UE, in a subframe i a first UL control information on a physical channel of a first UL serving cell; and
transmitting, from the UE, in the subframe i a second UL control information on a physical channel of a second UL serving cell;
wherein if the total transmit power of the UE exceeds $\hat{P}_{CMAX}(i)$, which is a linear value of UE total configured maximum output power in subframe i, the UE would scale down the transmit power of the physical channel with lower power priority based on types of the first UL control information and the second UL control information, and
wherein if the first UL control information type is the same as the second UL control information type, a PUCCH (Physical Uplink Control Channel) transmission would have higher priority than a PUSCH (Physical Uplink Shared Channel) transmission.

11. The communication device of claim 10, wherein the physical channel of the first UL serving cell is a PUCCH, and the physical channel of the second UL serving cell is a PUSCH.

12. The communication device of claim 10, wherein the UL control information includes a Scheduling Request, a HARQ-ACK (Hybrid Automatic Repeat Request Acknowledgement), or a CSI (Channel State Information) report.

13. The communication device of claim 12, wherein the Scheduling Request has higher power priority than HARQ-ACK, the HARQ-ACK has higher power priority than the CSI report, and an aperiodic CSI report has higher power priority than a periodic CSI report.

14. The communication device of claim 10, wherein if the first uplink control information on PUCCH is a CSI report and the second uplink control information on PUSCH is a HARQ-ACK (Hybrid Automatic Repeat Request Acknowledgement), a PUSCH transmission would have higher power priority than a PUCCH transmission.

15. The communication device of claim 10, wherein the configured serving cells are controlled or scheduled by different eNBs (evolved Node B).

16. The communication device of claim 10, wherein the first UL serving cell and the second UL serving cell belong to different PUCCH groups.

17. The communication device of claim 10, wherein the first UL control information includes the UL control information of the serving cells (including the first UL serving cell) belonging to a PUCCH group.

18. The communication device of claim 10, wherein the second UL control information includes the UL control information of the serving cells (including the second UL serving cell) belonging to a PUCCH group.

19. A method to handle UL (Uplink) control information, comprising:
configuring a UE (User Equipment) with multiple serving cells;
transmitting, from the UE, in a subframe i a first UL control information on a physical channel of a first UL serving cell; and
transmitting, from the UE, in the subframe i a second UL control information on a physical channel of a second UL serving cell;
wherein if the total transmit power of the UE exceeds $\hat{P}_{CMAX}(i)$, which is a linear value of UE total configured maximum output power in subframe i, the UE would scale down the transmit power of the physical channel with lower power priority based on types of the first UL control information and the second UL control information, and
wherein if the first uplink control information on PUCCH is a CSI report and the second uplink control information on PUSCH is a HARQ-ACK (Hybrid Automatic Repeat Request Acknowledgement), a PUSCH (Physical Uplink Shared Channel) transmission would have higher power priority than a PUCCH (Physical Uplink Control Channel) transmission.

20. The method of claim 19, wherein the physical channel of the first UL serving cell is a PUCCH, and the physical channel of the second UL serving cell is a PUSCH.

21. The method of claim 19, wherein the UL control information includes a Scheduling Request, a HARQ-ACK, or a CSI (Channel State Information) report.

22. The method of claim 21, wherein the Scheduling Request has higher power priority than HARQ-ACK, the HARQ-ACK has higher power priority than the CSI report, and an aperiodic CSI report has higher power priority than a periodic CSI report.

23. The method of claim 19, wherein if the first UL control information type is the same as the second UL control information type, transmit power of both physical channels would be scaled down by a same proportion.

24. The method of claim 19, wherein if the first UL control information type is the same as the second UL control information type, a PUCCH transmission would have higher priority than a PUSCH transmission.

25. The method of claim 19, wherein the configured serving cells are controlled or scheduled by different eNBs (evolved Node B).

26. The method of claim 19, wherein the first UL serving cell and the second UL serving cell belong to different PUCCH groups.

27. The method of claim 19, wherein the first UL control information includes the UL control information of the serving cells (including the first UL serving cell) belonging to a PUCCH group.

28. The method of claim 19, wherein the second UL control information includes the UL control information of the serving cells (including the second UL serving cell) belonging to a PUCCH group.

29. A communication device to handle UL (Uplink) control information, the communication device comprising:
- a control circuit;
- a processor installed in the control circuit;
- a memory installed in the control circuit and operatively coupled to the processor;
- wherein the processor is configured to execute a program code stored in the memory to handle UL control information by:
  - configuring a UE (User Equipment) with multiple serving cells;
  - transmitting, from the UE, in a subframe i a first UL control information on a physical channel of a first UL serving cell; and
  - transmitting, from the UE, in the subframe i a second UL control information on a physical channel of a second UL serving cell;
  - wherein if the total transmit power of the UE exceeds $\hat{P}_{CMAX}(i)$, which is a linear value of UE total configured maximum output power in subframe i, the UE would scale down the transmit power of the physical channel with lower power priority based on types of the first UL control information and the second UL control information, and
  - wherein if the first uplink control information on PUCCH is a CSI report and the second uplink control information on PUSCH is a HARQ-ACK (Hybrid Automatic Repeat Request Acknowledgement), a PUSCH (Physical Uplink Shared Channel) transmission would have higher power priority than a PUCCH (Physical Uplink Control Channel) transmission.

30. The communication device of claim 29, wherein the physical channel of the first UL serving cell is a PUCCH, and the physical channel of the second UL serving cell is a PUSCH.

31. The communication device of claim 29, wherein the UL control information includes a Scheduling Request, a HARQ-ACK, or a CSI (Channel State Information) report.

32. The communication device of claim 31, wherein the Scheduling Request has higher power priority than HARQ-ACK, the HARQ-ACK has higher power priority than the CSI report, and an aperiodic CSI report has higher power priority than a periodic CSI report.

33. The communication device of claim 29, wherein if the first UL control information type is the same as the second UL control information type, transmit power of both physical channels would be scaled down by a same proportion.

34. The communication device of claim 29, wherein if the first UL control information type is the same as the second UL control information type, a PUCCH transmission would have higher priority than a PUSCH transmission.

35. The communication device of claim 29, wherein the configured serving cells are controlled or scheduled by different eNBs (evolved Node B).

36. The communication device of claim 29, wherein the first UL serving cell and the second UL serving cell belong to different PUCCH groups.

37. The communication device of claim 29, wherein the first UL control information includes the UL control information of the serving cells (including the first UL serving cell) belonging to a PUCCH group.

38. The communication device of claim 29, wherein the second UL control information includes the UL control information of the serving cells (including the second UL serving cell) belonging to a PUCCH group.

* * * * *